United States Patent [19]
Merritts

[11] 3,774,940
[45] Nov. 27, 1973

[54] TRAILER ASSEMBLY

[76] Inventor: Floyd L. Merritts, 31564 William Ct., Rockwood, Mich. 48173

[22] Filed: Feb. 29, 1972

[21] Appl. No.: 230,311

[52] U.S. Cl.............. 280/408, 280/411, 280/432, 280/440
[51] Int. Cl............................................. B62d 53/08
[58] Field of Search.................... 280/404, 408, 411, 280/418, 432, 433, 434, 437, 439, 440; 296/50

[56] References Cited
UNITED STATES PATENTS

| | | | |
|---|---|---|---|
| 1,380,490 | 6/1921 | Masury | 280/439 |
| 1,858,769 | 5/1932 | Erskine | 280/408 |
| 1,866,055 | 7/1932 | Reid | 280/439 X |
| 1,880,123 | 9/1932 | Davis | 280/408 |
| 2,468,705 | 4/1949 | Price | 280/432 |
| 2,783,080 | 2/1957 | Ringsby | 296/50 |
| 2,923,560 | 2/1960 | Anderson | 280/440 |
| 3,420,547 | 1/1969 | Strausser | 280/432 |

Primary Examiner—Leo Friaglia
Assistant Examiner—Reinhard Eisenzopf
Attorney—Charles R. Rutherford

[57] ABSTRACT

The trailer assembly, pulled by a conventional tractor, includes a front trailer having an extended frame or frame extension on the existing frame, with the extended frame extending rearwardly and being provided with one or more axles with tires on the under side thereof. The rear trailer includes a frame having the front end portion thereof overlying the extended frame on the front trailer. The extended frame carries a rockable or pivotable fifth wheel while the front end portion of the frame of the rear trailer carries a rockable or pivotable fish plate assembly having a kingpin engageable with the fifth wheel to provide a very sturdy connection between the trailers thus eliminating draw bars, tow bars, or cables which are now employed between the trailers. Jackknifing between the trailers and swing and sway motion of the rear trailer with respect to the front trailer are eliminated. The pivot mountings for the fifth wheel and fish plate assembly have horizontal axes which are perpendicular to one another. The pivotable fish plate assembly takes up any side motion between the trailers to prevent excess forces from being exerted by the rear trailer on the extended frame thus preventing the extended frame of the front trailer from warping or breaking.

2 Claims, 7 Drawing Figures

PATENTED NOV 27 1973  3,774,940
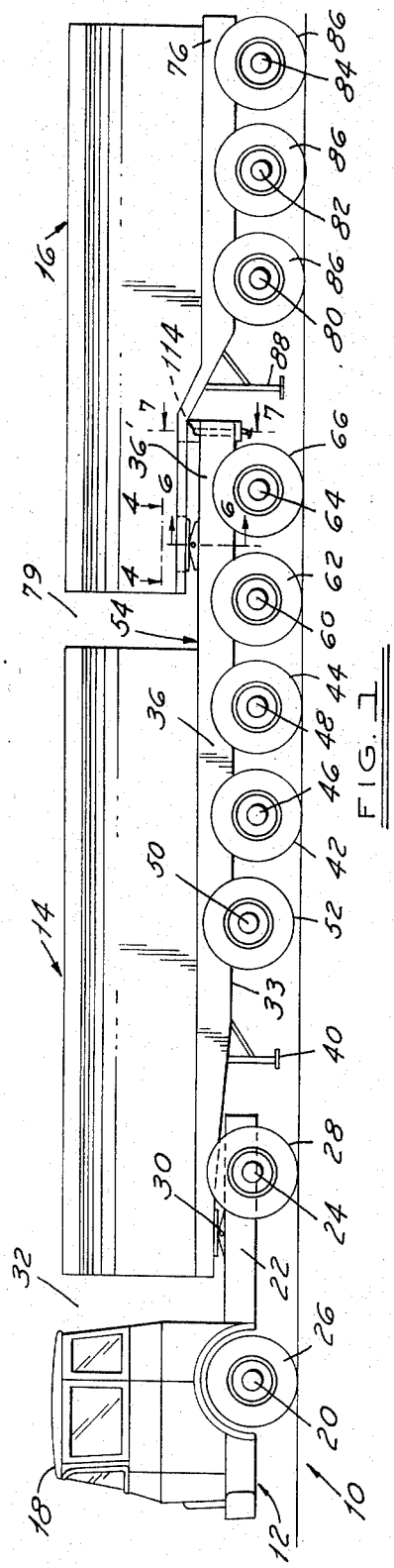
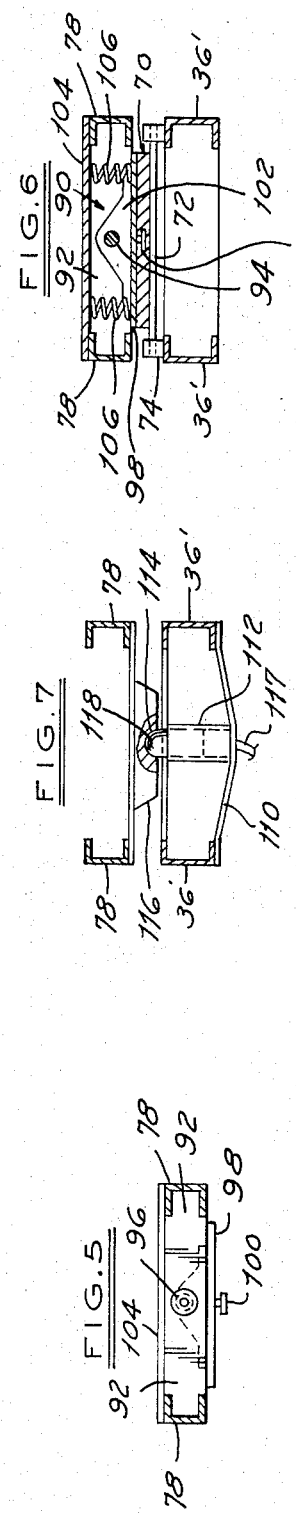
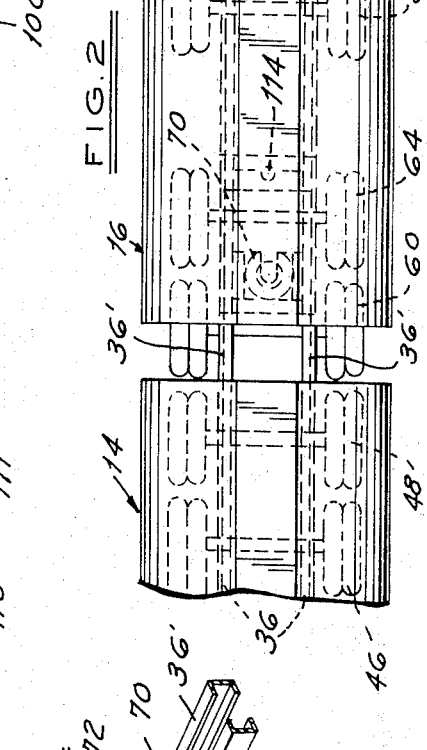
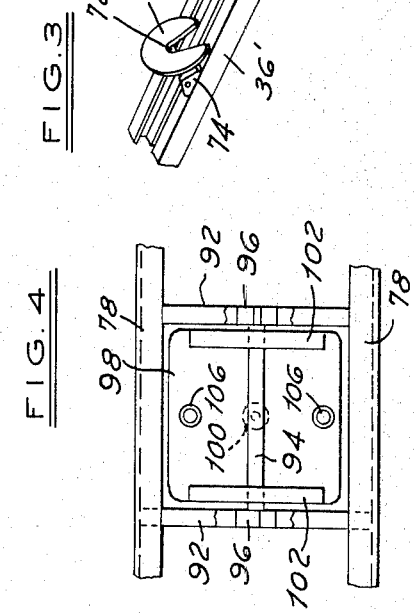

TRAILER ASSEMBLY

BACKGROUND OF THE INVENTION

1. Field of the Invention

This invention relates to a trailer assembly having two or more trailers, powered by a tractor. The primary object of the invention is to prevent "jackknifing" between the pulled trailers of the trailer assembly.

The term "jackknifing" as used herein is the undesired swinging of either of the pulled trailers to one side of the proper line of motion of the tractor, the two trailers closing upon one another as the blades of a jackknife. It is most likely to occur when the trailers are of the semi-trailer type, having rear wheels only, and supported at the front by a fifth wheel on the tractor and by a draw or two bar or cable between the trailers.

Such condition is almost invariably caused by skidding of wheels on the tractors or trailers or on all the vehicles. As long as the wheels are rolling, the tractor and trailers tend to move in the proper direction, but when the wheels begin to slide, they can move as easily in any other direction as they can move straight ahead. Consequently, when a slight turning or swinging movement of one of the tractor or trailers relative to another occurs, it is easy for such swinging movement to continue until the entire tractor-trailer assembly is out of control. The farther out-of-line the swinging vehicle gets, the harder it is to pull it back into line, since the fore-and-aft axis of its wheels is at a greater angle of inclination with respect to the direction of movement of the assembly, and its wheels are therefore less likely to resume normal rotation. Heretofore, one approach to the "jackknifing" problem has been to either increase the effectiveness of the trailer brakes or to provide means for applying the trailer brakes quickly.

2. Description of the Prior Art

Various means have been employed in the art for connecting front and rear trailers together including conventional fifth wheel constructions, draw and two bars, and cables. In addition, various devices are illustrated in the prior art for the specific purpose of eliminating jackknifing between pulled trailers and between tractor and trailers and for controlling the stopping of trailers when a slippery condition is encountered. Typical trailer constructions directed to the foregoing problems are illustrated in the following U.S. Pat. Nos.: Price, 2,468,705, issued Apr. 26, 1969; Ringsby, 2,783,080, issued Feb. 26, 1957; Black, 2,986,408, issued May 30, 1961; Chosy, 3,066,953, issued Dec. 4, 1962; Gregg, 3,070,386, issued Dec. 25, 1962; Ayers, 3,237,966, issued Mar. 1, 1966; and Hope et al., 3,328,051, issued June 27, 1967.

Even though some of the prior art devices illustrate fifth wheel constructions between trailers none of them illustrate a rockable or pivotable fifth wheel mounted on an extended frame of the front trailer, with the front end frame portion of the rear trailer being provided with a rockable or pivotable fish plate assembly which prevents any excess forces generated by the side motion of the rear trailer from being exerted on the extended frame of the front trailer. In addition, none of the prior art patents illustrate the combined fifth wheel-fish plate assembly as just described in combination with positive locking means interposed between the extended frame of the front trailer and the frame of the rear trailer in order to lock the trailers together when the tractor-trailer assembly encounters a slippery pavement or road.

SUMMARY OF THE INVENTION

The pulled trailers of the trailer assembly include a front trailer having a very rigid and sturdy extended frame with one or more axles with tires provided underneath the extended frame. The extended frame may, in connection with a new trailer, be manufactured as part of the original frame of the front trailer or in the case of a used trailer, the extended frame may be added to the existing frame by welding. The purpose of the extended frame is to permit a second or rear trailer to be positively connected to the front trailer in order to eliminate jackknifing between the pulled trailers and swing and sway motion of the rear trailer with respect to the front trailer.

The trailer connection employed between the pulled trailers include a rockable or pivotable fifth wheel mounted on the extended frame, with the pivot mounting for the fifth wheel extending transversely of the trailer assembly. The front frame portion of the rear trailer overlies the extended frame and is provided with a pivotable fish plate assembly having an axis extending parallel to the longitudinal axis of the trailer assembly. With such a construction the kingpin provided on the fish plate engages the fifth wheel to complete the sturdy connection.

The advantage of the pivotable fish plate assembly is that it takes up side motion between the pulled trailers to keep the extended frame from warping or breaking. Resilient means, as an example, in the form of coil springs, are provided in the pivotable fish plate assembly to help to maintain the fish plate or restore it to a generally horizontal position.

The present invention may be used with a tractor-trailer assembly wherein two or more relatively large trailers each having, as an example, a length of 24 feet or greater are pulled together. As an optional feature, locking means in the form of an air lock unit is interposed between the extended frame of the front trailer and the front frame portion of the rear trailer in order to positively lock the two trailers together so that the trailers can function as a single unit when the vehicle is required to stop on a slippery or wet pavement or road. With such a construction the second trailer is prevented from sliding to one side or the other.

The construction of the trailer assembly will provide a vehicle which can be operated safely when various driving conditions are encountered. Jackknifing and swing and sway motions are eliminated.

Thus it is a feature of the present invention to provide an extended frame at the end of the rear frame portion of the front trailer.

Another feature of the present invention is to provide a sturdy trailer connection including a rockable fifth wheel on the extended frame and a pivotable fish plate assembly on the front frame portion of the rear vehicle which overlaps the extended frame on the front vehicle.

Still another feature of the present invention is to provide a trailer assembly wherein the front and rear trailers may be positively connected together as a single unit when a slippery road condition is encountered.

A further feature of the present invention is to provide a multi-trailer assembly which permits the positive locking arrangement between the pulled trailers to be released as determined by the driver and when released to permit the tractor and trailers to make shorter turns.

Still another feature of the present invention is to eliminate dangerous two bars, draw bars, hitches and cables which are now employed between the pulled trailers now utilized on the highways.

Another feature of the present invention is to provide a connection between pulled trailers which can be constructed economically, with the trailer units being adapted to be separated in a relatively short period of time.

IN THE DRAWINGS

FIG. 1 is a side elevational view of a tractor-trailer assembly constructed in accordance with the teachings of the present invention;

FIG. 2 is a fragmentary plan view of the tractor-trailer assembly;

FIG. 3 is a perspective view illustrating the fifth wheel pivotally mounted on the extended frame of the front trailer;

FIG. 4 is a fragmentary plan view on line 4—4 of FIG. 1, with parts removed, and illustrating the pivot mounting for the fish plate assembly;

FIG. 5 is a front elevational view of the fish plate assembly;

FIG. 6 is a sectional view through the trailer connection taken on the line 6—6 of FIG. 1; and FIG. 7 is a sectional view of the optional air lock unit taken on the line 7—7 of FIG. 1.

DESCRIPTION OF A PREFERRED EMBODIMENT

The teachings of the present invention as discussed herein are applicable to a wide variety of road vehicles regardless of the use of the vehicles. The trailer combination may be used as tankers for carrying gasoline, oil or other liquids and for trailers carrying conventional shipping containers or trailers carrying other types of cargo such as steel, etc. The tractor-trailer assembly 10 includes a power unit or tractor 12, a first or front trailer 14 and a rear or second trailer 16 which as shown, are tanker units designed to carry a liquid. The power unit 12 of the tractor-trailer assembly 10 includes a cab 18 mounted directly over the trailer front axle 20. The tractor 12 includes a frame 22 which carries the tractor rear axle 24. Drive wheels 26 are provided on front axle 20 while drive wheels 28 are provided on the rear axle 24 of the tractor 12.

The front trailer 14 is connected to tractor 12 by a conventional relatively flexible hitch 30 including a pivotally mounted fifth wheel connected to a kingpin on the front end of the front trailer 14. In order to insure clearance between the cab 18 and front trailer 14 there is provided a safety or buffer space 32 as is well known in the art.

The front trailer 14 includes a frame 33 including a pair of longitudinally extending laterally spaced channel shaped members 36. The front end of the frame 36 is reduced in height to permit the kingpin carried on the under side thereof at the front end of the trailer 14 to engage the fifth wheel. The trailer 14 is provided near the front with a landing gear 40 which is shown in the raised position, as in transit, in FIG. 1. When the landing gear 40 is lowered and the tractor 12 removed from trailer 14, the landing gear 40 supports the trailer 14 and its load above the ground.

The rear end portion of the front trailer 14 is supported by two sets of dual road engaging wheels 42 and 44 mounted on axles 46 and 48 respectively. Located forwardly of axle 46 is axle 50 provided with dual wheels 52. The axle 50 is mounted for vertical movement by pneumatic means, not shown, whereby the axle 50 and the entire wheel assembly may be pneumatically raised out of contact with the ground and pneumatically lowered to contact the ground when required to support the load on the front trailer 14.

The front trailer 14 is further provided with a horizontally disposed rearwardly extending extension 54 secured to the rear frame portion of trailer 14, as shown in FIG. 1. The frame extension 54 includes a pair of longitudinally extending laterally spaced apart channel members 36' extending rearwardly as illustrated in FIG. 1. If the invention is applied to new trailers, the channel members 36' of the extended frame or extension 54 are incorporated as part of the frame 33. Thus aligned channel members 36 and 36' may be part of the same structural member forming the frame. If the invention is applied to existing trailers then the front ends of channel members 36' are welded to the rear ends of the aligned channel members 36 and otherwise suitably braced to provide a sturdy extended frame 54. The channel members 36' effectively increase the length of trailer regardless of the manner the extended frame is connected to vehicle 14. The extended frame 54 extends approximately eight feet to provide room for connection of the rear trailer. The extension 54 is supported by an axle 60 and dual wheels 62 (FIG. 1) and in addition the extended frame 54 may also be provided, as an optional feature, with a pneumatically operated lift axle 64 provided with dual wheels 66 which are shown in FIG. 1 in load bearing contact with the ground.

A fifth wheel assembly 70 is mounted on the extension 54 to the rear of axle 60 and intermediate axles 60 and 64, if the optional axle 64 is utilized. The fifth wheel 70 is mounted on a first pivot mounting or rod 72 having the ends thereof carried by bearings or pillow blocks 74. The pivot mounting or rod 72 extends transversely of the trailer assembly. The fifth wheel is a disc shaped plate mounted on rod 72 transversely spanning the frame members to permit the fifth wheel to rock to a substantially horizontal position when it is in use as shown in FIG. 6.

The rear tanker or trailer 16 is provided with a frame 76 including a pair of elongated channel shaped members 78 extending longitudinally, with the front part of the frame 76 being reduced in thickness to permit it to overlie the extension or extended frame 54 provided on the front trailer 14. in order to insure clearance between the trailers 14 and 16 there is provided a safety or buffer space 79. The rear trailer 16 is provided with axles 80, 82 and 84 having dual road-engaging wheels 86 thereon as is well known in the art. Means has been provided for maintaining the second or rear trailer 16 in an upright position when not connected to the primary or front trailer 14 and this means includes a conventional landing gear 88 as is well known in the art.

The front end of the frame 76 of the rear trailer 16 is provided with a rotatable fish plate assembly 90. The front portion of the frame 76 of the rear trailer 16 is provided with a pair of cross members 92 as illustrated in FIG. 4 which are bolted to the structural members 76 of the frame. The fish plate assembly includes a second pivot mounting 94 which extends parallel to the longitudinal axis of the trailer assembly, with the opposite ends of the pivot mounting or rod 94 being carried by bearings 96 mounted in the cross members 92 as shown in FIG. 4. The fish plate assembly 90 further includes a relatively flat fish plate or disc 98 having a downwardly extending kingpin 100. The fish plate 98 is provided with a pair of suitable brackets 102 at the side thereof. The second pivot mounting 94 extends through the brackets 102 to permit the fish plate 98 to rock about the pivot mounting 94. The axis of the second pivot mounting 94, which extends longitudinally of the trailer assembly 10, is perpendicular to the transversely extending axis of the first pivot mounting 72.

The fish plate assembly 90 further includes a cover plate 104 spanning the structural members 78 and the pivot mounting 94. The cover plate 104 helps to prevent dirt from entering the fish plate assembly 90. The fish plate assembly 90 also includes suitable resilient means 106, as an example, in the form of springs which are suitably guided and retained in the fish plate assembly 90. The springs 106 have opposite ends bearing upon the cover plate 104 and upon the fish plate or disc 98 as illustrated in FIG. 5. The pivotable fish plate assembly 90, when in use, is designed to take up any side motion between the trailers 14 and 16 and to thus prevent the extended frame 54 from warping or breaking. The trailers 14 and 16 are properly connected together when the kingpin 100 engages the slot provided in the fifth wheel 70 as shown in FIG. 6.

The use of the fifth wheel 70 and fish plate assembly 90 eliminates conventional tow bars, draw bars and cables between pulled trailers. The extended frame 54 with at least one supporting axle 60 under the fifth wheel 70 and the fish plate assembly 90 provides for a sturdy hook up between trailers 14 and 16. With such a construction the front end of trailer 16 is prevented from jackknifing to one side or the other which occurs with presently existing tractor-trailer assemblies. In addition, the connection also eliminates swing and sway motion of the rear trailer 16 since the fish plate or disc 98 is permitted to pivot to take up the side motion and thus prevent the extended frame 54 from warping or breaking. The resilient means 106 cushions the side motion and urges the pivotable fish plate or disc 98 to a horizontal position after it has been displaced by such side motion.

As an optional feature pneumatically operated means are provided for latching the trailers 14 and 16 together in order that they may function as a single unit. At the rear of the extended frame 54 a suitable housing 110 (FIG. 7) is provided in which is mounted a cylinder 112 having a reciprocal latching or locking element or piston 114 therein. The cylinder 112 is connected by a hose 117 to the pneumatic system, not shown, of the assembly 10. The front frame portion of the rear trailer 16 is provided with a locking member or keeper 116 having a recess 118 therein. The locking member or keeper 116 may be constructed in various ways. It may be located entirely within the front frame portion of the rear trailer 16 or mounted below same as shown for illustrative purposes. Energization of the pneumatic cylinder 112 is effective to urge the latching element or piston 114 upwardly into engagement with the locking member 116, as shown in FIG. 7, and thus lock the trailers 14 and 16 together in order for them to function as a single unit.

The latching or locking means, just described, is an optional feature provided for safety purposes. It is controlled by means of a switch, not shown, mounted in the cab 18 of the tractor 12. The operator actuates the switch when he is required to stop the vehicle assembly 10 on a slippery or wet pavement. Thus, the rear trailer 16 is prevented from sliding to one side or the other. When the assembly 10 is in use the latching means is inoperative. It is only energized when an emergency situation requires the trailers 14 and 16 to be so connected.

It should be appreciated that the number of axles utilized on each tractor 12 and trailers 14 and 16 are dependent upon the laws of the state in which the vehicles are utilized. The number of axles illustrated in FIG. 1 are permitted in the State of Michigan. In addition, the use of pneumatically operated lift axles are optional.

While I have described my invention in detail, it is obvious that others who are skilled in the art can devise and build alternate and equivalent constructions which are within the spirit and scope of my invention; hence, I desire that my protection be limited only by the proper scope of the appended claims.

What I claim as my invention is:

1. A trailer assembly adapted to be transported by a tractor comprising a front trailer having front and rear frame portions including in combination a horizontally disposed frame extension on the rear frame portion of said front trailer and extending rearwardly thereof, said frame extension being provided with a first pair of axles on the under side of said frame extension, with each axle having at least a pair of tires, a fifth wheel mounted on said frame extension, a rear trailer having front and rear frame portions, the rear frame portions of said front and rear trailers each having on the under side thereof one or more additional axles having ground engaging wheels thereon, the front frame portion of said rear trailer overlying the frame extension on said front trailer, a fish plate assembly including a downwardly extending kingpin on said front frame portion of said rear trailer, said kingpin of said fish plate assembly and said fifth wheel when engaged providing a sturdy connection between the front and rear trailers, with said kingpin being located in a plane intermediate said first pair of axles on said frame extension, said frame extension comprises a pair of longitudinally extending laterally spaced structural members, said fifth wheel having a first and lower pivot mounting rotatably carried by said structural members, with the axis of the pivot mounting extending laterally of the trailer assembly, the front frame portion of said rear trailer including a pair of laterally spaced structural elements, a pair of braces interposed between said structural elements and forming part of said fish plate assembly, a second and upper pivot mounting rotatably carried by said braces and extending parallel to the longitudinal axis of the trailer assembly, said fish plate assembly including a cover plate above said second pivot mounting and a fish plate below said second pivot mounting having means for mounting same on said second pivot mounting, said cover plate being secured to said structural elements, said kingpin being carried by said fish plate, said fish plate being adapted to rotate about said second pivot mounting when the kingpin is engaged with the fifth wheel to take up side motions between the trailers and prevent excess forces from being applied to the extended frame, and resilient means in the form of a pair of springs interposed in said fish plate assembly between said cover plate and said fish plate for helping to maintain the fish plate in a horizontal plane, said springs being located on opposite sides of said second pivot mounting, said cover plate forming a dirt shield.

2. The trailer assembly defined in claim 1 wherein means are provided for positively locking said rear trailer to said front trailer, said means comprising a locking element carried by said frame extension of said front trailer engageable with a locking member carried by the front frame portion of said rear trailer.

* * * * *